United States Patent
Luhmann et al.

(10) Patent No.: US 6,865,152 B2
(45) Date of Patent: Mar. 8, 2005

(54) METHOD AND APPARATUS FOR TRANSMITTING PACKETS ONTO A NETWORK

(75) Inventors: Patrick J. Luhmann, Hillsboro, OR (US); Patrick L. Connor, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 802 days.

(21) Appl. No.: 09/738,110

(22) Filed: Dec. 15, 2000

(65) Prior Publication Data

US 2002/0075801 A1 Jun. 20, 2002

(51) Int. Cl.⁷ .............................................. H04L 1/00
(52) U.S. Cl. .................................. 370/230; 370/236.1
(58) Field of Search .................................. 370/230, 236, 370/236.1, 329, 390, 250, 412; 710/63

(56) References Cited

U.S. PATENT DOCUMENTS

| | | | | |
|---|---|---|---|---|
| 5,784,358 A | * | 7/1998 | Smith et al. | 370/236.1 |
| 5,978,359 A | * | 11/1999 | Caldara et al. | 370/236 |
| 6,185,229 B1 | * | 2/2001 | Obikane et al. | 370/537 |
| 6,301,258 B1 | * | 10/2001 | Katseff et al. | 370/412 |
| 6,349,097 B1 | * | 2/2002 | Smith | 370/390 |
| 6,381,661 B1 | * | 4/2002 | Messerly et al. | 710/63 |
| 6,430,628 B1 | | 8/2002 | Connor | |
| 6,510,145 B1 | * | 1/2003 | Kim et al. | 370/329 |
| 6,597,662 B1 | * | 7/2003 | Kumar et al. | 370/236 |
| 6,614,756 B1 | * | 9/2003 | Morgenstern et al. | 370/230 |
| 6,647,438 B1 | | 11/2003 | McVay et al. | |
| 6,721,835 B1 | | 4/2004 | Connor | |
| 2002/0083189 A1 | | 6/2002 | Connor | |
| 2002/0144004 A1 | | 10/2002 | Gaur et al. | |
| 2002/0194332 A1 | | 12/2002 | Connor | |
| 2003/0058852 A1 | | 3/2003 | Luhmann et al. | |
| 2003/0065735 A1 | | 4/2003 | Connor | |

\* cited by examiner

Primary Examiner—Salvatore Cangialosi
(74) Attorney, Agent, or Firm—Libby H. Hope

(57) ABSTRACT

A network driver for transmitting packets. For a particular embodiment the driver receives an indication that a packet is available for transmission and monitors a packet pending transmission status of a network controller. The driver then indicates to the network controller that the packet is available for transmission only when the pending transmission status in one particular embodiment reaches a threshold value. Thus the driver determines how many packets to provide a network controller based on the amount of packets still waiting to be transmitted by the controller.

36 Claims, 6 Drawing Sheets

METHOD AND APPARATUS FOR TRANSMITTING PACKETS ONTO A NETWORK

BACKGROUND OF THE INVENTION

1. Field

The embodiments of the present invention relates generally to communication and more specifically to a driver for transmitting packets onto a high speed Ethernet network.

2. Background

Network controllers are used to transmit and receive Ethernet packets from a network media. Ethernet speeds typically include 10 Megabit, 100 Megabit, 1 Gigabit or 10 Gbit per second technologies as described in the ANSI/IEEE 802.3 specifications, published Oct. 2000. The network controller is typically coupled into the bus of a computer. The computer has a processor and host memory. The computer has an operating system that communicates using a software driver to the network card when an application in the computer needs to transfer information onto the network media for distribution to the Internet or other computers.

Operating systems provide indications to a software driver that one or more packets are available for transmission onto a network media. Drivers respond to the operating system by processing each packet by creating a table that contains a location in memory where the packets are stored, as well as the length of the packet. The driver then informs the network controller that the packet is available for fetching and transmission onto the network media. The network controller receives packets from memory and stores the packet in an internal cache. The network controller then transmits the cached packet onto the network media.

The driver typically receives multiple packets from the operating system. In one method, the driver then processes one packet at a time, and then immediately informs the network controller after each packet is processed, that a processed packet is available for transmission. Alternatively in a second method, the driver may process all the packets it has been given, and then informs the controller that all packets are available for transmission.

The first method improves packet latency because the network controller learns about each packet as soon as it is available for transmission. However, this first method has the drawback of reduced bus efficiency, since a bus transaction is required to process each individual packet.

The second method increases bus efficiency because the entire table of packets only requires a single bus transaction to inform the network controller that the packets are available for transmission. However, this method has the drawback of reduced packet latency because the first packet sits idle and is not handled by the network controller until the driver processes the subsequent packets.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

Figure 1:
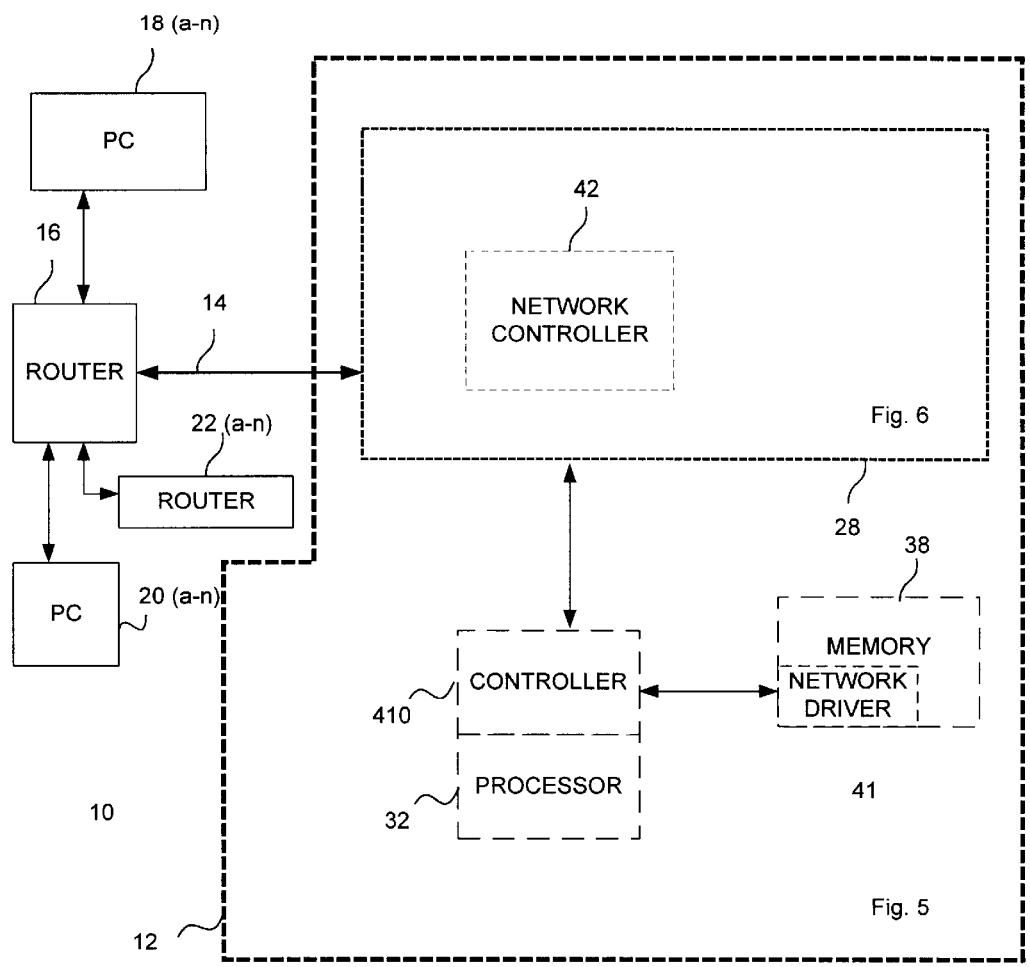
FIG. 1 is a diagram of a network having a host computer and router connected to other network devices.

Referring to FIG. 1, there is shown an Ethernet network 10 having a personal computer (PC) 12 connected through network media 14 to a network infrastructure device such as a Router, switch or hub 16 and PC's 18(a–n). Network media 14 may be an optical fiber or cable media, but may include other media such as wireless, optical or other medias. PC 12 may be coupled through Router 16 to PC's 20(a–n) or other network infrastructure devices such as a Routers or switches 22(a–n). PC 12 includes a network controller module 28 having a network controller 42 coupled through controller 410 to processor 32 and host memory 38. Processor 32 executes a network driver 61 for controller module 28 that is stored in memory 38. Further details of controller 42, controller 410 and processor 32 will be discussed later in connection with FIGS. 5 and 6.

Figure 2:
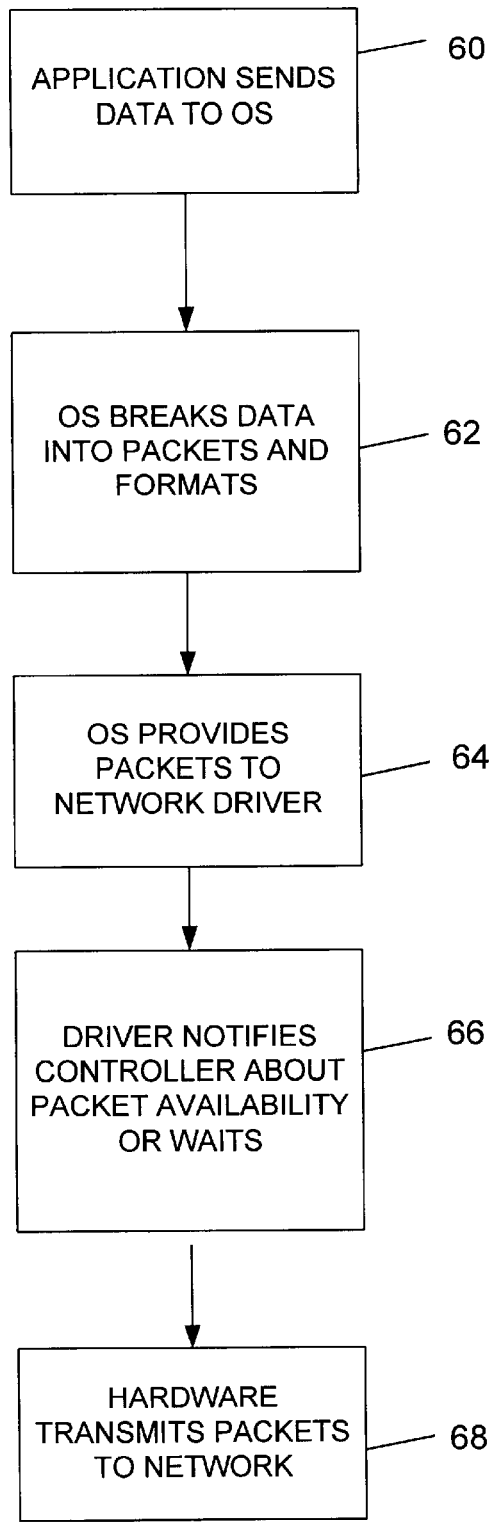
FIG. 2 is flow diagram of a packet transmit path in accordance with an embodiment of the present invention.

Referring to FIG. 2, there is shown an embodiment of the flow diagram showing the process for transmitting a data packet. In accordance with the embodiments of invention, an application program provides data to be transmitted to a PC operating system in block 60. Exemplary operating systems include Windows™ OS distributed Microsoft Corporation of Redmond, Wash., or Linux OS. The operating system then in block 62 breaks up data into packets to be transmitted and stores these packets in host memory 38. The operating system also formats the packets by attaching headers and media access control information to the packets. OS formats the packets prior to passing them to the network driver. These packets or buffers, as known in the art typically contain an Ethernet packet having a Media Access Control (MAC) header, a Transmit Control Protocol/Internet Protocol (TCP/IP) header and application data.

Next in block 64 the network driver 41 may be called by the operating system. The operating system then passes one or more packets to the network driver 41 and indicates a packet is available for transmission. The network driver 41 then in block 66 prepares the packets for transmission by creating a data structure containing the location and length of the packets provided by the operating system in host memory 38. In one embodiment, the data structure may be a table. The driver 41 then determines, by checking the status of the network controller 42 and using the process described in more detail in FIG. 4, whether to indicate to the network controller 42 to transmit packets or whether to prepare more packets for transmission. Once the status of the network controller 42 indicates that the number of pending transmissions of packets in its buffers has reaches a predetermined threshold value, the driver 41 provides an indication, including the location and length of the packets, to the network controller 42 to transmit all the prepared packets. The number of pending transmission could be said to reach this predetermined level when the number of pending transmission is below a predetermined value or if an up-counter is used to track the pending transmissions, when the up-counter reaches the predetermined value. The network controller 42 in block 68 transfers the prepared packets from host memory 38 into its internal First In First Out register (FIFO) 51 (FIG. 6) for transmission on the network media 14.

Figure 3:
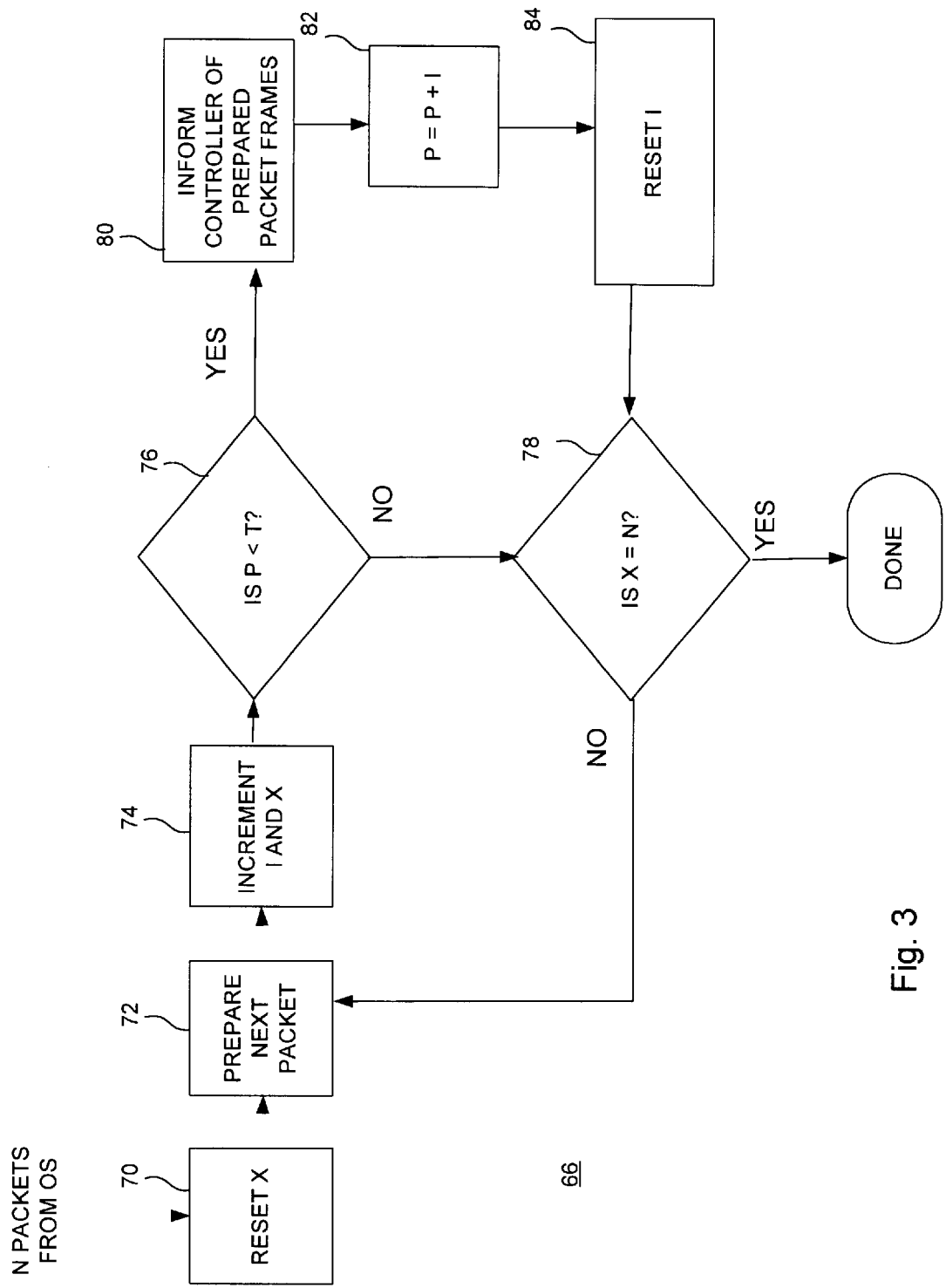
FIG. 3 is a flow diagram of the process executed by the network driver shown in FIG. 2 when transmitting packets in accordance with an embodiment the present invention.

Referring to FIG. 3, there is shown the process in block 66 used by the network driver 41 to determine which packets controller 42 should transmit. The process 66 starts in block 70 with a call by the operating system providing an indication that a number (N) of packet frames are to be transmitted. When driver 41 is first loaded (for example, as part of the boot process of the operating system), the Indexes P, T and I are set to zero. Index I corresponds to the number of packets prepared since the last time the driver informed the network controller 42 that prepared packets are ready to be transmitted. The network driver in block 70 sets a local variable X to zero.

Then in block 72 the next packet may be prepared for transmission as described previously in connection with FIG. 2. Then in block 74, the value of Index I and X are incremented. In block 76 the driver determines whether value P, representing the current number of packets provided to the controller 42 for transmission and not yet transmitted, is less than a predetermined threshold value T. Value P is also referred to herein as the packet pending transmission status. Value P is preferably stored in host memory 38 and may be updated on an interrupt from network controller 42. The threshold value T typically ranges from 1 to 4 but does not require a bounded upper limit. Value T may be set to a value that promotes maximum performance of network controller 42. Value T would be set based on the time network controller 42 can handle an interrupt and to ensure that there are always packets pending in the FIFO 51 and available for transmission. i.e. T may be set to be a low value so that the network driver updates the network controller 42 as infrequently as possible, but preferably T is not set to such a low value that the network controller 42 runs out of packets in FIFO 51 before provided more packets.

If Value P is not less than value T, then the driver executes block 78. This typically occurs if the network is congested or a large number of packets are provided to the network controller 42. If Value P is less than value T, then the network driver in block 80 provides an indication to controller 42 that prepared packet frames are available for transmission, including the location and size of the packet frames in host memory 38.

In block 78, the driver determines if the value of variable X is equal to the number N frames to be transmitted. If it is not, the driver prepares the next packet frame in block 72. If X=N, the process ends. At a later time, either during the interrupt handler or during a subsequent send handler all the packets prepared by the driver may be sent to controller 42 for transmission.

After block 80, the driver in block 82 increments the value of Index P by the value of Index I. The driver then in block 84 resets the value of Index I and then executes block 78.

Figure 4:
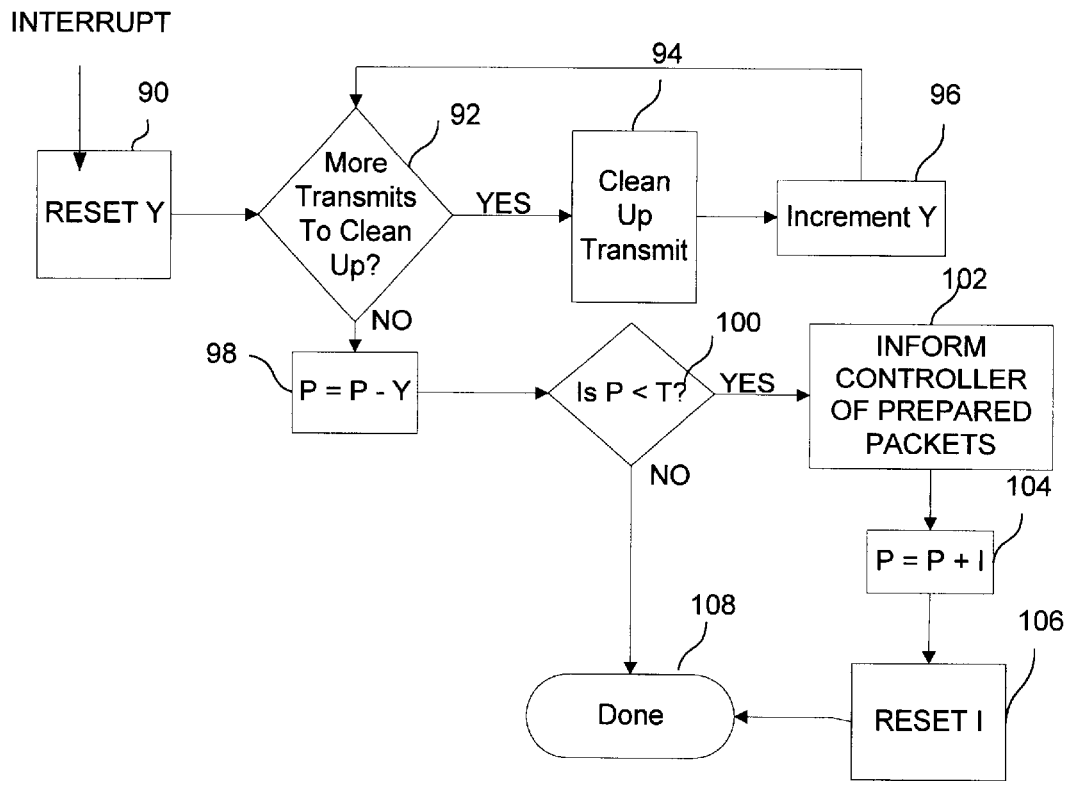
FIG. 4 is a flow diagram of the interrupt path in accordance with an embodiment of the present invention.

In FIG. 4, there is shown a process executing an interrupt from controller 42 in response to a packet being fetched for transmission, when a packet is received or when packets in Controller's 42 FIFO 51 have been transmitted. On an interrupt, the process in block 90 handles a receive packet using known techniques and Resets a local variable Y. Then in block 92, the process determines by reading a status bit in memory 38 whether there is more packets in to be transmitted by controller 42, e.g. whether all the data and information in FIFO 51 been transmitted. If the information has been transmitted, in block 94 transmit process is "cleaned up" by indicating to driver 41 that the information in FIFO has been transmitted and the transmit resources in controller 38 are made available. Then in block 96, variable Y is incremented.

If there are not any transmits to be cleaned up, then in block 98 Index P is decremented by the value of variable Y. Then in step 100 the value of Index P is compared to the value of Index Y. If Index P is less than T, the controller 42 is informed that prepared packets are available for transmission in block 102. Then in block 104 Index P is incremented by the value of Index I and the value of Index I is reset in block 106.

If index P is not less than Index T in block 100 or after block 106 the routine in block 108 terminates by providing an indication to the operating system of the memory locations of the sent packets that have been released.

In the preceding description, various aspects of the present invention have been described. For purposes of explanation, specific numbers, systems and configurations were set forth in order to provide a thorough understanding of the present invention. However, it is apparent to one skilled in the art having the benefit of this disclosure that the present invention may be practiced without the specific details. In other instances, well-known features were omitted or simplified in order not to obscure the present invention.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 5:
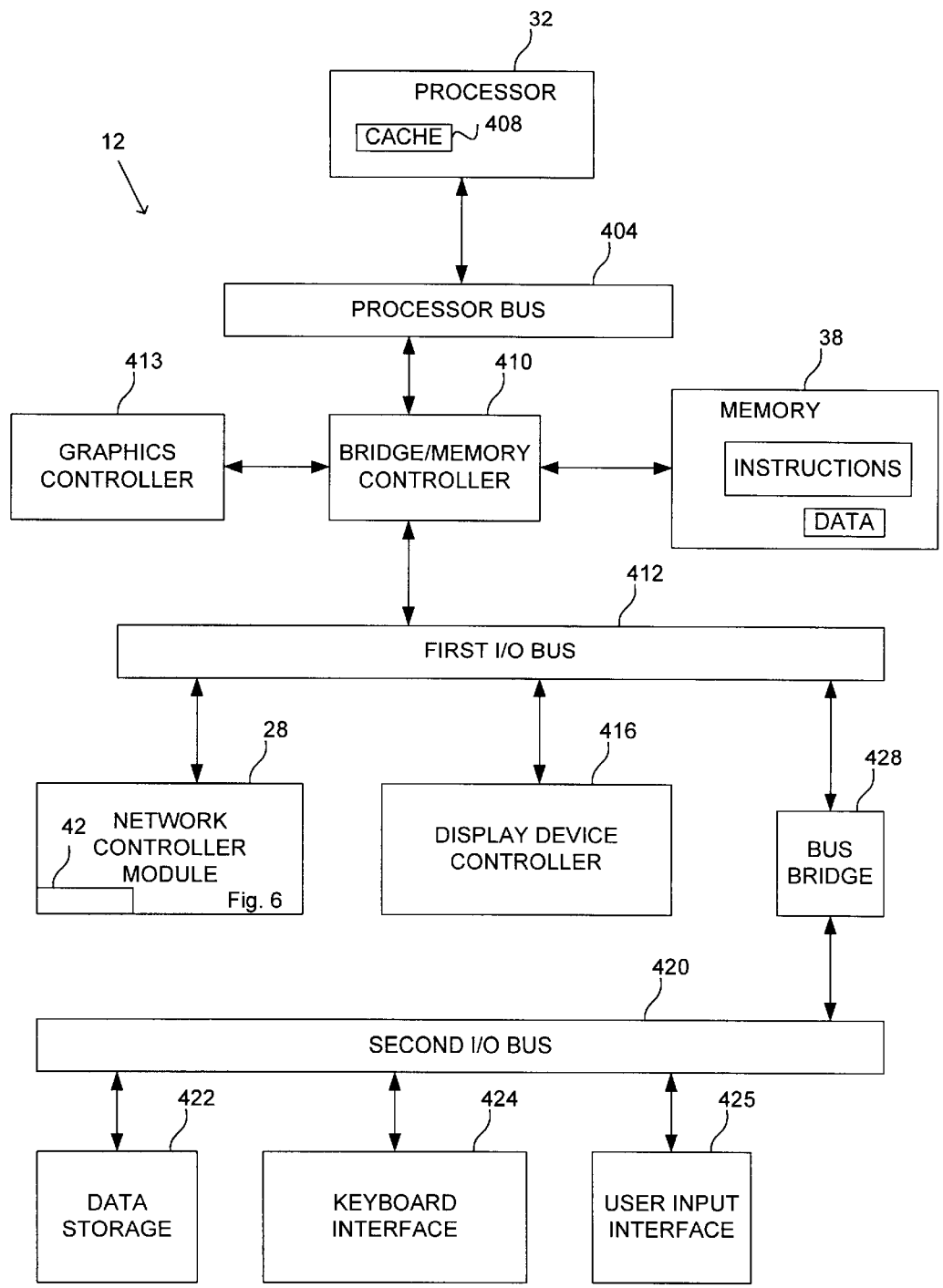
FIG. 5 is a diagram of a computer system shown in FIG. 1 having a network controller in accordance with an embodiment the present invention.

Another example of such type of processing system is shown in FIG. 5, however, other systems may also be used and not all components of the system shown are required for the present invention. Sample system 12 may be used, for example, to execute the processing for embodiments of the network driver system, in accordance with the present invention, such as the embodiment described herein. Sample system 12 is representative of processing systems based on the PENTIUM®III, PENTIUM® IV and CELERON™ microprocessors available from Intel Corporation, although other systems (including personal computers (PCs) having other microprocessors, engineering workstations, other set-top boxes, and the like) and architectures may also be used. PENTIUM®III, PENTIUM® IV and CELERON™ are trademarks of Intel Corporation.

FIG. 5 is a block diagram of a system 12 of an embodiment of the present invention. The system 12 includes a processor 32 that processes data signals. Processor 32 may be coupled to a processor bus 404 that transmits data signals between processor 32 and other components in the system 12.

System 12 includes a memory 38. Memory 38 may store instructions and/or data represented by data signals that may be executed by processor 32. The instructions and/or data may comprise code for performing any and/or all of the techniques of the present invention. Memory 38 may also contain additional software and/or data (not shown). A cache memory 408 may reside inside processor 32 that stores data signals stored in memory 38.

A bridge/memory controller 410 may be coupled to the processor bus 404 and memory 406. The bridge/memory controller 410 directs data signals between processor 32, memory 38, and other components in the system 12 and bridges the data signals between processor bus 404, memory 38, and a first input/output (I/O) bus 412.

In this embodiment, graphics controller 413 interfaces to a display device (not shown) for displaying images rendered or otherwise processed by the graphics controller 413 to a user.

First I/O bus 412 may comprise a single bus or a combination of multiple buses. First I/O bus 412 provides communication links between components in system 12. A network controller module 28 may be coupled to the first I/O bus 412. In some embodiments, a display device controller 416 may be coupled to the first I/O bus 412. The display device controller 416 allows coupling of a display device to system 12 and acts as an interface between a display device (not shown) and the system. The display device receives data signals from processor 32 through display device controller 416 and displays information contained in the data signals to a user of system 12.

Figure 6:
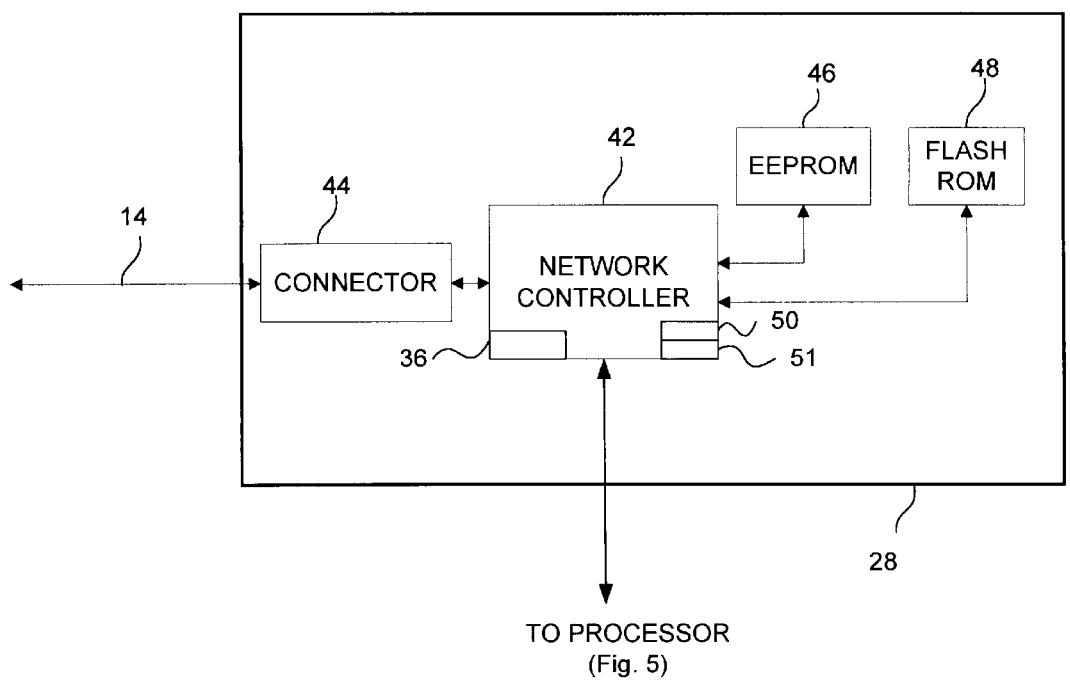
FIG. 6 is a diagram of the network controller module shown in FIGS. 1 & 5.

Referring to FIG. 6, Controller module 28 includes a network controller 42 coupled through a media connector 44 to network 14. In one embodiment exemplary network controller 42 may be model number 82559 manufactured by Intel Corporation. Network controller 42, is preferably coupled on module 28 to a non-volatile memory such as an EEPROM 46 and electrically programmable memory 48. EEPROM 46 holds static configurations of network controller 42. Flash ROM 48 allows network controller 42 to operate independently of control circuit 30. Network 14 is typically a physical network medium such as a CAT5 or fiber cable that handles 10 or 100 or 1000 Base TX signals. Network controller 42 is preferably an Ethernet network controller with an integrated physical interface.

Network controller 42 preferably contains an internal memory element, or external memory element hereafter referred to as cache 50 and a Direct Memory Access (DMA) controller 36. Module 42 also has an internal memory such as a FIFO 51 to store incoming and outgoing packets or alternately may use cache 50 to function as a FIFO. DMA controller 36 can perform direct memory access functionality to transfer multiple fragments of a packet from host memory 38 into its internal cache prior to transmission.

Referring to FIG. 5, Network controller 42 receives commands and data from processor 32 through bus 412. Bus 412 is preferably a PCI bus, but could be any bus that permits address and data to be transferred between module 42 and controller 410. Data in host memory 38 is typically transferred to controller 42 using a DMA controller 36 or read/write instructions of microprocessor 42. Referring to FIG. 6, network controller 42 transmits and receives packet information 53 on line 14 through media connector 44. Network controller 42 on receipt of a packet or upon transmission of all packets in its FIFO 51 provides an interrupt to microprocessor 32.

Referring to FIG. 5, a second I/O bus 420 may comprise a single bus or a combination of multiple buses. The second I/O bus 420 provides communication links between components in system 12. A data storage device 422 may be coupled to the second I/O bus 420. A keyboard interface 424 may be coupled to the second I/O bus 420. A user input interface 425 may be coupled to the second I/O bus 420. The user input interface may be coupled to a user input device, such as a remote control, mouse, joystick, or trackball, for example, to provide input data to the computer system. A bus bridge 428 couples first I/O bridge 412 to second I/O bridge 420.

Embodiments of the present invention are related to the use of the system 12 as a network driver. According to one embodiment, such processing may be performed by the system 12 in response to processor 32 executing sequences of instructions in memory 404. Such instructions may be read into memory 404 from another computer-readable medium, such as data storage device 422, or from another source via the network controller 414, for example. Execution of the sequences of instructions causes processor 32 to execute the network driver according to embodiments of the present invention. In an alternative embodiment, hardware circuitry may be used in place of or in combination with software instructions to implement embodiments of the present invention. Thus, the present invention is not limited to any specific combination of hardware circuitry and software.

The elements of system 12 perform their conventional functions in a manner well-known in the art. In particular, data storage device 422 may be used to provide long-term storage for the executable instructions and data structures for embodiments of the network driver system in accordance with the present invention, whereas memory 406 is used to store on a shorter term basis the executable instructions of embodiments of the network driver system in accordance with the present invention during execution by processor 32.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments" are not necessarily all referring to the same embodiments.

If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Those skilled in the art having the benefit of this disclosure will appreciate that many other variations from the foregoing description and drawings may be made within the scope of the present invention. Indeed, the invention is not limited to the details described above. Rather, it is the following claims including any amendments thereto that define the scope of the invention.

What is claimed is:

1. A method for transmitting packets in a network driver comprising:
   receiving an indication that a packet is available for transmission;
   monitoring a packet pending transmission status of a network controller; and
   indicating to the network controller that the packet is available for transmission when the pending transmission status reaches a threshold value.

2. The method as recited in claim 1 wherein the threshold value is a predetermined threshold value, and transmitting the packet onto a network when the indication is provided to network controller that the packet is available for transmission.

3. The method as recited in claim 2 further comprising storing in a host memory the current number of packets pending for transmission by the network controller; and monitoring the packet pending transmission status by reading from host memory said current number of packets pending.

4. The method as recited in claim 3 further comprising:
   receiving a packet with the network controller from the network; and
   monitoring the packet pending transmission status of the network controller in host memory when the network controller receives a packet from the network.

5. The method as recited in claim 2 further comprising preparing packets for transmission by storing in a host memory the location and length of the packet to be transmitted.

6. The method as recited in claim 2 further comprising delaying indicating to the network controller that the packet is available for transmission until the pending transmission status falls below the predetermined threshold value.

7. The method as recited in claim 1 further comprising receiving the indication that the packet is available from an operating system.

8. The method as recited in claim 1 further comprising providing the packet as an Ethernet packet having a MAC header, a TCP/IP header and application data.

9. An apparatus for transmitting packets comprising:
   A network controller to receive an indication that a packet is available for transmission; and
   A processor to monitor a packet pending transmission status of the network controller, wherein said processor provides an indication to the network controller that the packet is available for transmission in response to the pending transmission status reaching a threshold value.

10. The apparatus as recited in claim 9 wherein said processor indicates to the network controller when the number of packets remaining to be transmitted by the network controller is below a predetermined threshold, and wherein said network controller transmits the packet onto a network when the indication is provided to network controller that the packet is available for transmission.

11. The apparatus as recited in claim 9 further comprising a memory in communication with the processor for storing the packet pending transmission status of the network controller and for storing the packet.

12. The apparatus as recited in claim 11 further comprising a memory element disposed within the network controller to store the packet prior to transmission; and a DMA controller to transfer packets from the memory element to the network controller.

13. The apparatus as recited in claim 12 wherein the processor is operative to monitor the packet pending transmission status of the network controller when a packet is received from the network media.

14. The apparatus as recited in claim 12 wherein the processor is operative to cause the network controller to store in a buffer, packets to be transmitted and to read the transmission status of the network controller after the network controller has transmitted all its packets.

15. The apparatus as recited in claim 9 wherein the threshold values range from 1 to 4.

16. An apparatus for transmitting packets comprising:
   Means for receiving an indication that a packet is available for transmission;
   Means for monitoring a packet pending transmission status of a network controller; and
   Means for indicating to the network controller that the packet is available for transmission in response to the pending transmission status falling below a predetermined threshold value.

17. The apparatus as recited in claim 16 further comprising means for transmitting the packet onto a network when the indication is provided to network controller that the packet is available for transmission.

18. The apparatus as recited in claim 17 further comprising means for storing the packet prior to transmission, and means for transferring packets form the storage means to the network controller.

19. A system for transferring packets comprising:
   a. a computer having
      i. a processor coupled to a host memory and a bus;
      ii. a network controller coupled to the bus, said controller having a driver operative to receive an indication that a packet is available for transmission; said processor operative to monitor a packet pending transmission status of a network controller and provide an indication to the network controller that the packet is available for transmission in response to the pending transmission status reaching a threshold value; and
   b. a network media to which said packets are transmitted when the indication is provided to network controller that the packet is available for transmission.

20. The system as recited in claim 19 further comprising a host memory operative to store the current number of packets pending for transmission by the network controller; and said processor monitoring the packet pending transmission status by reading from host memory said current number of packets pending.

21. The system as recited in claim 20 wherein said processor reads the packet pending transmission status when a packet is received from the network media.

22. An article comprising:
   a storage medium having a plurality of instructions, which when executed by a processor, cause transmission of packets by:
      receiving an indication that a packet is available for transmission;

monitoring a packet pending transmission status of a network controller; and indicating to the network controller that the packet is available for transmission only when the pending transmission status reaches a threshold value.

23. The article as recited in claim 22 wherein the threshold value is a predetermined threshold value, and wherein the article further comprises instructions to transmit the packet onto a network when the indication is provided to network controller that the packet is available for transmission.

24. The article as recited in claim 22 further comprising instructions to store in a host memory the current number of packets pending for transmission by the network controller; and monitor the packet pending transmission status by reading from host memory said current number of packets pending.

25. The article as recited in claim 24 further comprising instructions to:

receive a packet with the network controller from the network; and monitor the packet pending transmission status of the network controller in host memory when the network controller receives a packet from the network.

26. The article as recited in claim 23 further comprising instructions to prepare packets for transmission by storing in a host memory the location and length of the packet to be transmitted.

27. The article as recited in claim 23 further comprising instructions to delay indicating to the network controller that the packet is available for transmission until the pending transmission status falls below the predetermined threshold value.

28. The article as recited in claim 22 further comprising instructions to receive the indication that the packet is available from an operating system.

29. The article as recited in claim 22 further comprising instructions to provide the packet as an Ethernet packet having a MAC header, a TCP/IP header and application data.

30. A network comprising:

a destination node;

a router coupled to the destination node by a network medium to forward data packets to the destination node; and a source node comprising:

a network controller to receive an indication that a data packet addressed to the destination node is available for transmission to the router; and a processor to monitor a packet pending transmission status of the network controller and to provide an indication to the network controller that the data packet addressed to the destination node is available for transmission in response to the pending transmission status reaching a threshold.

31. The network as recited in claim 30 wherein said processor indicates to the network controller in response to the number of packets remaining to be transmitted by the network controller being below a predetermined threshold, and wherein said network controller transmits the packet onto a network in response to the providing the indication to network controller that the packet is available for transmission.

32. The network as recited in claim 30, wherein the source node further comprises a memory in communication with the processor for storing the packet pending transmission status of the network controller and for storing the packet.

33. The network as recited in claim 32, wherein the network controller further comprises a memory element to store the packet prior to transmission, and wherein the source node further comprises a DMA controller to transfer packets from the memory element to the network controller.

34. The network as recited in claim 33 wherein the processor is operative to cause the network controller to store packets in a buffer to be transmitted and to read the transmission status of the network controller in response to the network controller having transmitted each packet in the buffer.

35. The network as recited in claim 30 wherein the threshold values range from 1 to 4.

36. The network of claim 30, wherein the packet is formatted according to a TCP/IP protocol and the router is capable of forwarding the packet to the destination node based upon the TCP/IP protocol.

* * * * *